United States Patent [19]

Grosskurth et al.

[11] Patent Number: 4,721,399
[45] Date of Patent: Jan. 26, 1988

[54] PLAIN BEARING PROVIDED WITH A DEVICE FOR LOCALLY DETERMINING THE TEMPERATURE OF ITS SLIDING

[75] Inventors: Hans Grosskurth, Walluf; Fritz Schwarz, Langenselbold, both of Fed. Rep. of Germany

[73] Assignee: Braunschweiger Huttenwerk GmbH, Braunschweig, Fed. Rep. of Germany

[21] Appl. No.: 920,950

[22] Filed: Oct. 16, 1986

Related U.S. Application Data

[63] Continuation of Ser. No. 735,917, May 20, 1985, abandoned.

[30] Foreign Application Priority Data

May 18, 1984 [DE] Fed. Rep. of Germany ....... 3418448

[51] Int. Cl.$^4$ .......................... F16C 17/24; G01K 1/16
[52] U.S. Cl. ..................................... 384/448; 384/129
[58] Field of Search ................... 116/218; 340/870.17; 374/153, 165; 384/448, 278, 9, 900, 902, 905, 624, 271

[56] References Cited

U.S. PATENT DOCUMENTS

| | | |
|---|---|---|
| 1,448,157 | 3/1923 | Selik ........................ 308/1 A |
| 2,839,594 | 6/1958 | Schneidersmann ............ 374/208 X |
| 2,961,875 | 11/1960 | Felix . |
| 3,052,123 | 9/1962 | Gustafson .................... 374/153 |
| 3,824,579 | 7/1974 | Waseleski, Jr. et al. ....... 308/1 H X |
| 4,208,472 | 6/1980 | Cho et al. ................. 308/DIG. 8 X |
| 4,355,912 | 10/1982 | Haak ..................... 374/208 |

FOREIGN PATENT DOCUMENTS

| | | |
|---|---|---|
| 7313958 | 4/1973 | Fed. Rep. of Germany . |
| 139299 | 10/1978 | German Democratic Rep. . |
| 54-19039 | 2/1979 | Japan .................... 308/DIG. 14 |
| 58-13221 | 1/1983 | Japan ..................... 384/448 |

OTHER PUBLICATIONS

Messen+Prüfen/Automatik, Jul./Aug. 1979, pp. 567–573.

Primary Examiner—Stuart S. Levy
Assistant Examiner—Lynn M. Sohacki
Attorney, Agent, or Firm—Karl F. Ross; Herbert Dubno

[57] ABSTRACT

A plain bearing includes a support base which carries a sliding layer and is supported in a bearing housing. For locally determining the temperature of the sliding layer, a heat conductor is inserted in the support base which transmits the heat to a temperature sensing and measuring element located in the bearing housing. The heat conductor is positioned in a plug and surrounded therein by a sheathing. In order to provide an intimate contact between the heat conductor and the temperature sensing and measuring element, the latter is biased by a spring in direction to the heat conductor. By means of guide tracks, the support base can be turned into the bearing housing as the element will be retracted by the guide track against the force of the spring and runs along the circumference of the support base until being in alignment with the heat conductor.

15 Claims, 6 Drawing Figures

PLAIN BEARING PROVIDED WITH A DEVICE FOR LOCALLY DETERMINING THE TEMPERATURE OF ITS SLIDING

This is a continuation of co-pending application Ser. No. 735,917 filed on May 20, 1985 now abandoned.

FIELD OF THE INVENTION

Our present invention refers to plain bearings, in particular to plain bearing sleeves equipped with devices for locally determining the temperature of the sliding layer.

BACKGROUND OF THE INVENTION

A plain bearing, as contrasted with a rolling bearing has a sliding surface with low wearing and low slding friction characteristics In general, plain bearings include a support or base upon which a sliding layer is applied either directly or indirectly to form the bearing face.

In such bearings, wear of the sliding layer which is caused by abrasion may lead to damage to the bearing as well as of the rotating element, e.g. a shaft journaled in the bearing bushing or sleeve Since the wear of the sliding layer causes also an increase of temperature in the area of the bearing face in comparison with the normal operational temperature, preventive measures are required which can include monitoring of the temperature of the sliding layer. Thus, bearing damages and resulting extensive repair costs can be avoided when a temperature increase is detected in time.

U.S. Pat. No. 2,961,875 describes a device for sensing the temperature of bearings which includes a thermocouple having a pair of wires which extend within a borehole provided in the support base of the bearing. The borehole is accessible from outside and leads to the sliding layer. At the end adjacent to the sliding layer, the wires are inserted in a plug after being joined together and placed in direct heat transfer relationship with the sliding layer and the interface between this layer and the rotary member.

The publication "messen +prüfen/Automatik, July/August 1979, pages 567 to 573, describes thermoelements inserted in such boreholes which can be fixed via inserted plugs, or by completely filling the borehole with the thermoelement. In the latter case, the thermoelement is made of a solid material having the same temperature and heat transfer coefficients as the material for the bearing.

These systems have the disadvantage that a replacement of the plain bearing will either render a reuse of the but in thermoelements impossible or the retrieval of the thermoelements very complicated and expensive .

The German patent document DE-GM No. 73 13 958 thus proposes to provide the bores within the support base of the sliding bearing and in the bearing nest of the bearing housing in such a manner that a temperature sensor can be inserted and removed at any time. Since vibration or other relative movement between the sliding bearing and the bearing nest cannot be prevented, the bores must be provided with such a dimension that a sufficient play of the temperature sensor is dotained within the bore. On the other hand, it must be taken into account that the provision of play does not allow a fixed and stable attachment of the temperature sensor to the support base. Such an attachment, however, is necessary for providing a reliable determination of temperature. A further drawback of this construction is that once the slding layer wears out, the temperature sensors as inserted according to the DE-GM No. 73 13 958 can come into direct contact with the surface of the machine part supported by the sliding bearing, and thus would not only impair the operation of the bearing but would also be damaged. Thus, this system does not provide a reliable determination of the temperature of the bearing running surface upon gradually increasing wear of the sliding layer In order to avoid these deficiencies caused when inserting temperature sensors in boreholes, the German Democratic Republic patent DD-PS No. 139 299 proposes to use the sliding layer and the support base of the sliding bearing as parts of a thermoelement since these parts are made of different materials and thus can be expected to have a defined thermo-electromotive force. This technique has, however, also considerable drawbacks. Apart from the fact that the provision of electric contacts with the sliding layer of the bearings is difficult and cumbersome to achieve and such contacts will be damaged once the wear of the sliding layer increases, it should be noted that due to the electrical conductivity of the sliding layer and the support base only an average temperature of the entire bearing face can be determined. A local measurement of the temperature cannot be provided. Further this prior art requires a direct connection between the sliding layer and the support base and thus is not possible when thin layers are used for different functions between the support base and the sliding layer.

OBJECTS OF THE INVENTION

It is thus the principal object of our present invention to provide an improved plain bearing which allows the determination of the temperature of the sliding layer and obviates the afore-stated drawbacks.

Another object of this invention is to provide an improved plain sleeve bearing in which the temperature sensor is removable, accurate and practically insensitive to vibration.

SUMMARY OF THE INVENTION

We realize these objects by providing temperature measuring means which includes a heat conductor extending in a borehole provided in the support base and a temperature sensing and measuring element arranged in the bearing housing. The heat conductor has one end section which is in thermally conductive connection with the sliding layer and extends towards the circumference of the support base at which point its other end section contacts the temperature sensing and measuring element and thus is in thermally conducting relationship therewith.

Since the heat conductor is an inexpensive part, there are practically no financial losses when a sliding bearing is replaced and the heat conductor remains in the support base. The advantage of the present invention resides in the fact that an exchange of the sliding bearing does not necessitate the dismantling or removal of the temperature sensor and a loss thereof is prevented.

The heat conductor extends from a defined location of the bearing face towards the outer circumference of the support base and thus allows a determination of the temperature of a distinct location of the bearing surface so that critical areas thereof which are especially subjected to wear are accurately monitored as to the prevailing temperature. It is thus not necessary to incorporate the temperature sensing and measuring element directly into the support base.

The heat conductor is solidly mounted in the support base so that no significant reduction of the stability of the support base is obtained which is true even if a number of such heat conductors are installed.

Since the heat conductor has a pin-like shape, a well-defined heat transfer from the chosen measuring position at the sliding layer to the circumference of the support base is obtained. The temperature thus measured at the circumference of the support base is defined and reproduceable and corresponds to the temperature prevailing at the selected measuring position.

According to a further feature of the invention, one end section of the heat conductor adjacent to the sliding layer is in heat conducting contact with the support base or with an intermediate base layer which is applied on the support base while its remaining portion is heat insulated against the support base or base layer by a sheathing or packet of thermal insulation material. Consequently, the measurement is not negatively affected since a heat transfer to the heat conductor is provided only via the sliding layer and not via the support base.

Positioning of the heat conductor and the respective sheathing within the borehole of the support base is obtained by a stuffing box which fits accurately into the borehole and embraces the conductor and the sheathing. The stuffing box which can be pressed or screwed into the borehole is a stable element so that the sliding layer is not subjected to negative influences by the heat conductor.

Advantageously, the stuffing box is coated at its surface facing the sliding layer with metal, preferably with a bearing alloy showing emergency running properties. Such a coating is especially of advantage when the sliding bearing is provided with an additional base layer of e.g. leaded bronze or the like interposed between the support base and the sliding layer. The stuffing box can then be made of the same material as the base layer.

In order to prevent material of the heat conductor from penetrating the bearing surface, we have found it be advantageous to provide a distance between the respective end of the heat conductor and the bearing surface either by shortening the axial dimension of the heat conductor or by providing a recess in the sliding layer in elongation of the heat conductor. In a similar manner, the other end of the heat conductor may also be arranged at a distance to the circumference of the support base so as to provide a certain protection for the temperature sensing and measuring element. In addition, a contact between the heat conductor and the bearing housing is avoided thereby. We may note, however, that a support of the heat conductor along selected parts of the bearing housing can also be of advantage in order to guarantee a secure mechanical support of the heat conductor within the nest of the bearing housing. A heat dissipation to the nest of the bearing housing—if significant—must then be considered upon temperature determination.

According to a further feature of the invention, each temperature sensor cooperates with a guide track through which the temperature sensor projects beyond the nest of the bearing housing and from which it can be retracted when a plain bearing bush is inserted in the bearing housing. The sensor is retracted into the nest of the bearing housing and then allowed to run along the circumference of the support base until being aligned with the respective heat conductor. The guide track can be of short length and is arranged at the circumference of the support base.

BRIEF DESCRIPTION OF THE DRAWING

The above and other objects, features and advantages of our present invention will become more readily apparent from the following description, reference being made to the accompanying drawing in which.

SPECIFIC DESCRIPTION

Figure 1:
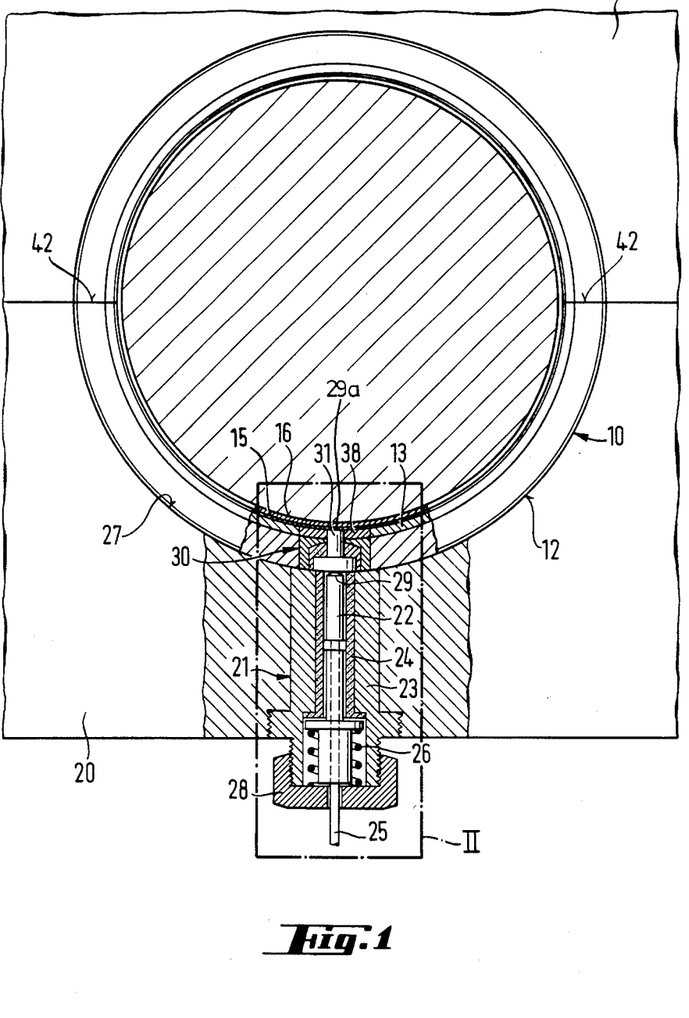
FIG. 1 is a radial section which illustrates a sliding bearing according to the invention inserted in a bearing housing and equipped with a unit for determination of the temperature.

FIG. 1 shows a circular plain bearing bush 10 with its outer circumference 12 accurately positioned in a bearing nest 27 of a bearing housing 20 (only part of the bearing housing is shown in FIG. 1).

Accomodated within the bush 10 is a plug assembly 30 which cooperates with a temperature sensing and measuring device 21 fixed within the bearing housing 20.

We may note that any number of plug assemblies 30 and cooperating temperature sensing and measuring devices 21 can be provided so as to allow determination of the prevailing temperature at any arbitrary location of the bearing face as will be described hereinafter.

The plug assembly 30 includes an elongated heat conductor 31 with one end 29a facing and in thermally conducting relation with the bearing surface and with its other end 29 being in contact and in thermally conducting relation with a temperature sensor 22 of the temperature sensing and measuring device 21. The temperature sensor 22 incorporates a suitable thermal instrument like e.g. a thermoelement which is connected via lead 25 to an indicator (not shown) to allow monitoring of the temperature.

Figure 2:
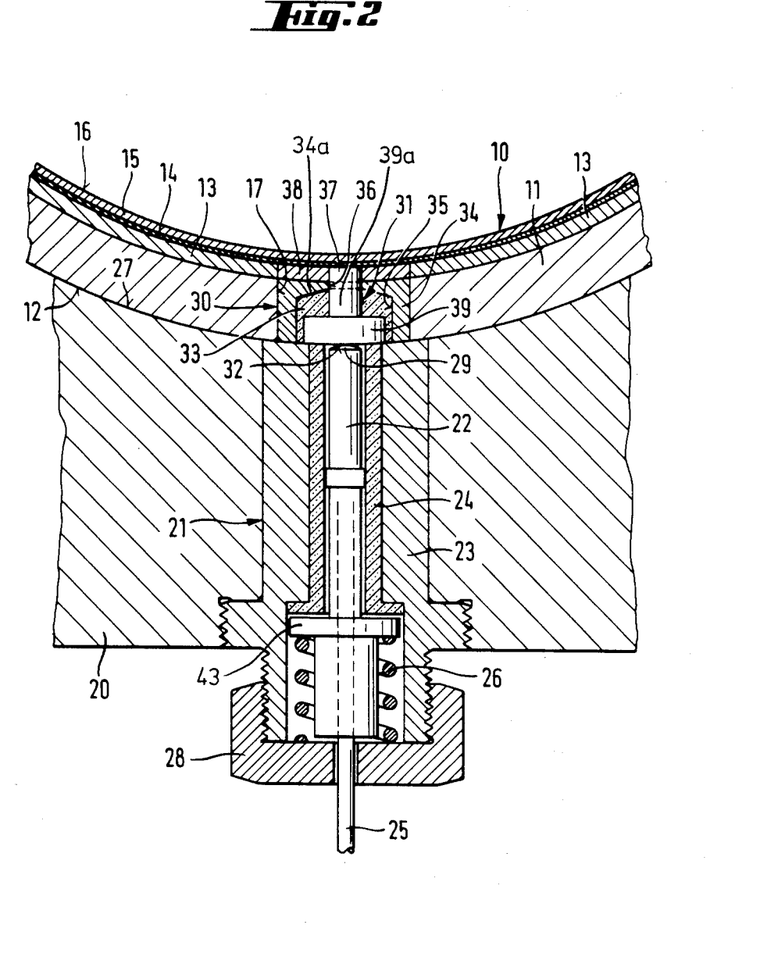
FIG. 2 illustrates the temperature determination unit of FIG. 1 on an enlarged scale in a similar section of the region II of FIG. 1.

Turning now in particular to FIG. 2 which shows the sliding bearing 10 as well as the plug assembly 30 and the temperature sensing and measuring device 21 in more detail, it may be seen that the sliding bearing bush 10 includes a shell-shaped support base 11 of steel which rests within the nest 27 of the bearing housing 20. Along its innerside, the support base 11 is coated with a base layer 13 e.g. of leaded bronze over which a thin diffusion barrier layer 14 e.g. of nickel is applied. Coated over the layer 14 is a sliding layer 15 which carries a bearing surface 16 forming the inntermost part of the sliding bearing 10, e.g. to support a shaft (not shown).

At a suitable location, the support base 11 is provided with a borehole 17 which extends from the outer circumference 12 to the diffusion barrier layer 14. Within the borehole 17, the plug assembly 30 is arranged as will now be described.

Centered within the borehole 17 is the heat conductor 31 in form of a pin of inverted T-shape so as to define a head portion 39 and an elongated or shank portion 39a extending to the barrier layer 14. The head portion 39 which thus has a wider diameter than the elongated portion 39a has an outer end face 32 which is in heat conducting contact with the temperature sensor 22. As is shown in FIG. 2, the contour of the end face 32 is such that it is flush with the contour of the circumference 12.

The heat conductor 31 is retained in its position by a plug or box 34 having a recess 35 and which is pressed or screwed into the borehole 17 and is made of steel.

It is preferred that the box 34 and the support base 11 be made of same material in order to maintain complete stability of the support base. The stuffing box 34 is of inverted cup-like shape and has a top portion 34a defining a central through-passage 36 through which the elongated portion 39a projects.

As illustrated in FIG. 2, the through-passage 36 and the portion 39a of the heat conductor 31 have essentially the same diameter. Therefore, the heat conductor 31 is held tightly and securely within the through-passage 36 so that no vibrations or other negative movements can be transmitted via the heat conductor 31 to the area of the sliding layer 15.

Except for the through-passage 36, the box 34 surrounds the heat conductor 31 at a distance. The so-formed space in recess 35 is filled by a thermal insulating sheathing 33 e.g. made of synthetic resin or ceramics. In the latter case, the sheathing 33 is fittingly cemented into the box 34. Preferably, the heat conductor 31 is cast with the thermal insulating sheathing 33 within the stuffing box 34, for example with casting resin In vicinity of the through-passage 36, the elongated portion 39a of the heat conductor 31 is pressed in a tight heat conducting contact with the box 34.

Figure 3:
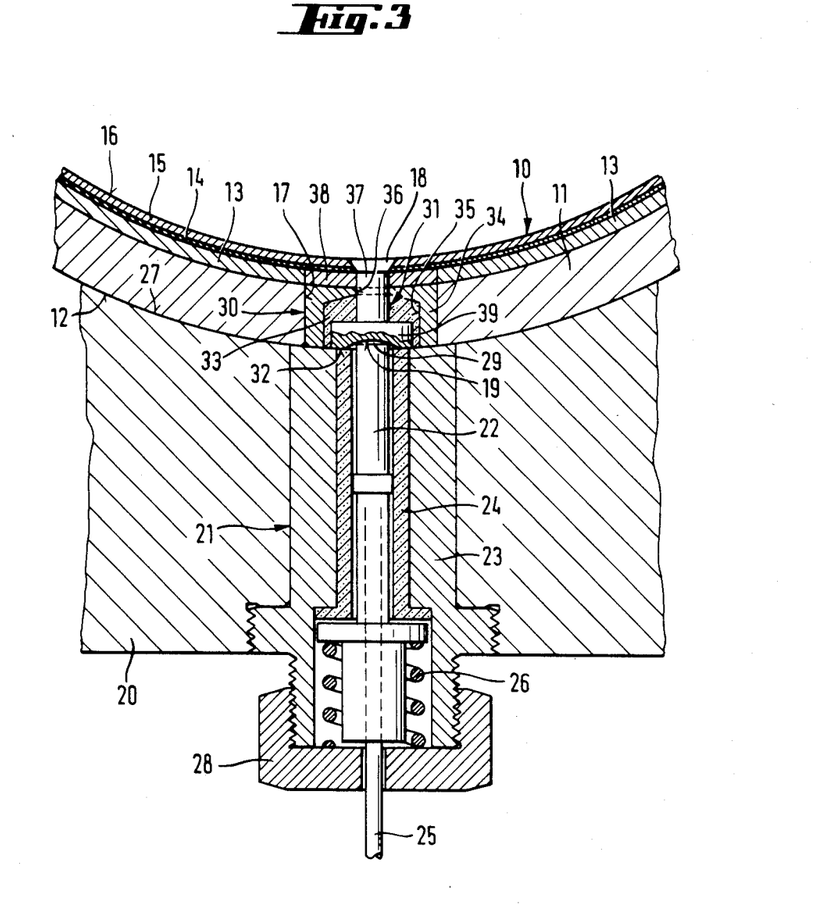
FIG. 3 is another radial section which illustrates a modified embodiment of the temperature determination unit.
Figure 4:
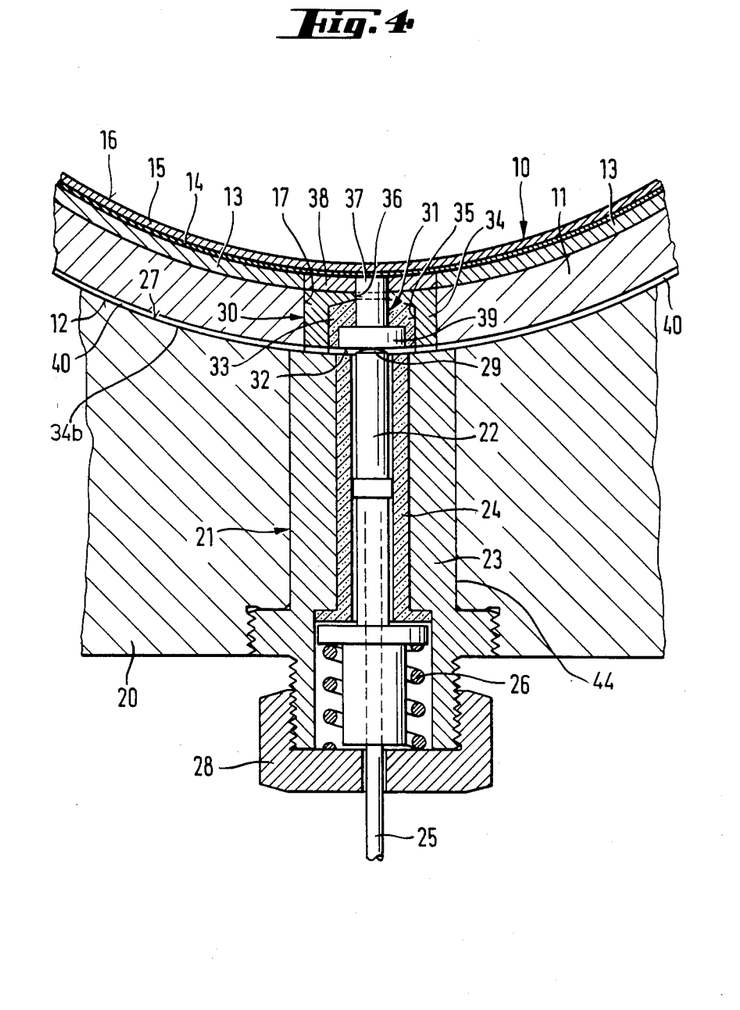
FIG. 4 is a radial section through a further embodiment of the temperature determination unit.

As illustrated in FIGS. 2 to 4, the elongated portion 39a of the heat conductor 31 projects with its extremity 37 beyond the passage 36 and thus beyond the stuffing box 34 and is in heat conducting contact with a metal layer 38 which surrounds the extremity 37 and extends over the end face of the stuffing box 34. The metal layer 38 extends in elongation of the base layer 13 and is made of the same material as the latter, that is leaded bronze with emergency running properties.

The head portion 39 is in heat conducting contact with the respective inward end 29 of the temperature sensor 22. The temperature sensor 22 is axially movable within a sleeve 23 which is inserted—e.g. screwed—into a respective borehole 44 of the bearing housing 20. Inbetween the sleeve 23 and the temperature sensor 22 extends a heat insulating guide bush 24 which thus surrounds the temperature sensor 22.

At its lower end, the temperature sensor 22 is provided with a flange portion 43 against which one end of a compression spring 26 abuts.

At a distance from the flange portion 43 is a screw cap 28 which is screwed to the sleeve 23 outside the bearing housing 20 and supports the other end of the spring 26 which exerts a pressure onto the temperature sensor 22 in a radially inward direction so that the inward end 29 is in intimate contact with the end face 32 of the heat conductor 31.

As can be seen from FIG. 2, the rearward end face 32 of the head portion 39 of the heat conductor 31 and the respective annular contour of the sheathing 33 as well as the annular contour of the stuffing box 34 are flush with the arched outer circumference 12 of the support base 11. This can be achieved through suitable surface finishing. Likewise, the exposed surface of the metal layer 38 and the surface of the extremity 37 of the heat conductor 31 flush with the inner plane of the base layer 13. This can be achieved by broaching the sliding bearing bush 10 prior to application of the diffusion barrier layer 14 and the sliding layer 15. Consequently, the metal layer 38 as well as the inner extremity 37 of the heat conductor 31 are continuously covered in a smooth manner by the layers 14 and 15, and simultaneously, an intimate and safe heat conducting connection between sliding layer 15 and heat conductor 31 is obtained.

Although the heat conductor 31 abuts with its rearward end face 32 partly against the annular sleeve 23 of the temperature sensing and measuring device 21, we may note that this area of contact can be kept to a minimum in practice so that measuring results are not influenced in a significant manner by heat dissipation. In order to provide high heat conductivity, the conductor 31 is made of silver or copper in the present embodiments.

Turning now to FIG. 3 which shows the temperature determination unit essentially corresponding to the one illustrated in FIG. 2 except that the sliding layer 15 is provided with a recess 18 in vicinity of the heat conductor 31 and the head portion 39 is provided with an indentation 19 at its circumference opposing the temperature sensor 22. As shown in FIG. 3, the recess 18 is truncated cone shaped and extends from the extremity 37 outwardly which is thus exposed. Through the provision of the recess 18, material of the heat conductor 31 is prevented from penetrating to the bearing surface 16 and thus to cause problems. In addition, the recess 18 serves as a lubricant pocket or the bearing surface 16 and the lubricant provides a heat conducting contact between the conductor element 31 and the running surface 16 or sliding layer 15, respectively.

It is, however, also possible to shorten the axial extension of the heat conductor 31 by at least the width of the sliding layer so that the extremity 37 is pulled back relative to the bearing surface 16. The determination of the temperature will not be impaired since the heat conductor 31 is in intimate heat conducting contact with the support base 11 or the base layer 13 in the area below the sliding layer 15. In this case, if necessary, the extremity 37 can be covered by the sliding layer 15 so that direct contact is obtained between the sliding layer 15 and the heat conductor and the latter is prevented from influencing the bearing surface 16.

It is, however, also possible to shorten the axial extension of the heat conductor 31 by at least the width of the sliding layer so that the extremity 37 is pulled back relative to the bearing surface 16. The determination of the temperature will not be impaired since the heat conductor 31 is in intimate heat conducting contact with the support base 11 or the base layer 13 in the area below the sliding layer 15. In this case, if necessary, the extremity 37 can be covered by the sliding layer 15 so that direct contact is obtained between the sliding layer 15 and the heat conductor and the latter is prevented from influencing the bearing surface 16.

At its other end remote to the recess 18, the heat conductor 31 is provided with the indentation into which the end portion 29 of the temperature sensor 22 projects. For allowing easy sliding of the end portion 29 into or out of the indentation 19, the latter as well as the end portion 29 are rounded at its opposing edges. The temperature sensor 22 projects beyond the sleeve 23 and the heat insulating guide bush 24 essentially by the width of the indentation 19 so as to be in contact with the head portion 39 of the heat conductor 31.

In FIG. 4, the difference to the temperature determination unit as shown in FIG. 2 resides primarily in that the end face 32 which is in contact with the end portion 29 of the temperature sensor 22 is arranged at a distance from the circumference 12 so as to be offset thereto. The annular rearward end face 34b of the stuffing box 34 is, however, aligned with the outer circumference 12 of the support base 11. Thus, the conductor element 31 together with the surrounding sheathing 33 are pulled back with respect to the circumference 12 and thus with respect to the annular end face 34b of the stuffing box 34. This design provides a certain protection for the temperature sensing and measuring device 21.

In comparison the embodiment of FIG. 2, the jacket 35 of the stuffing box 34 is wider and the head portion 39 has a smaller diameter. Therefore, the area by which the stuffing box 34 is supported on the sleeve 23 is increased. Further, the heat conductor 31 is prevented from being supported by the sleeve 23 so that heat losses are avoided. When the insertion of the bearing bush 10 into the bearing housing 20 is obtained by turning the bush into the appropriate position, the temperature sensor 22 is to be retracted and then brought into alignment with the heat conductor 31. It is obvious that the temperature sensing and measuring unit 21 should be arranged at an easily accessible location of the bearing housing 20 in order to allow proper positioning of the bush 10 in the bearing housing 20.

Figure 5:
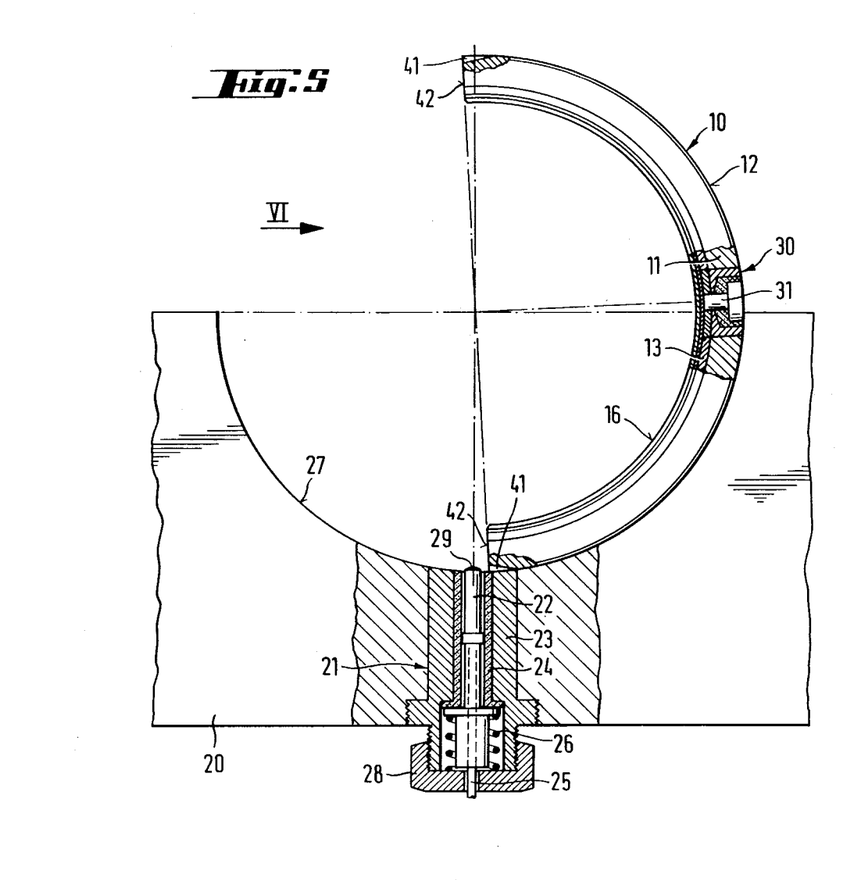
FIG. 5 illustrated in an elevational view partly broken away, the sliding bearing during insertion into the bearing housing.
Figure 6:
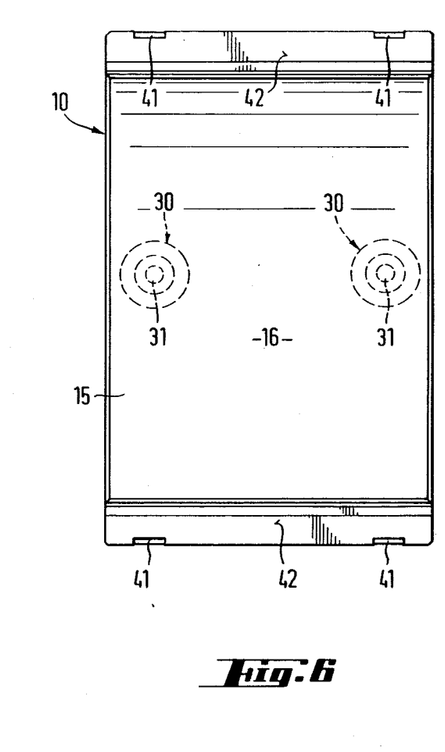
FIG. 6 is a partial view of the sliding bearing taken in direction of arrow VI in FIG. 5.

More commonly, however, we bias the temperature sensor 22 (as illustrated in the FIGS. 1 to 5) so that the latter will project beyond the nest 27 when no bearing bush 10 is arranged therein. In order to allow a simple assembly of the bush 10 in the nest 27, adjacent to each parting plane 42, guide tracks 41 are provided which facilitate the insertion of the bearing bush 10 into the bearing housing 20. The guide tracks 41 are arranged at each end section of the outer circumference 12 adjacent to each of the parting planes 42 and are aligned with the outer end face 32 of the respective heat conductor 31 in peripheral direction (see FIGS. 5 and 6). In the embodiment of FIG. 4, a guide groove 40 is provided which extends from the end face 32 of the conductor 31 to each side along the outer circumference 12 and leads to a respective guide track 41 arranged at the end sections of the bearing bush 10.

Upon insertion of the shell 10 into the bearing housing 20, the end section 29 of the temperature sensor 22 projecting beyond the nest 27 under the force exerted by the spring 26 is positioned within the guide track 41 which then forces—upon further turning of the bearing bush 10 by the length of circumferential angle—the temperature sensor 22 to retract until the latter abuts against the circumference 12 of the bearing shell 10 and eventually, the heat conductor 31 is aligned and in intimate contact with the temperature sensor 22. In FIG. 4, the end section 29 is guided by the guide track 41 (see FIG. 5) into the groove 40 and through further rotation of the bush 10 is brought into contact with the end face 32 of the conductor 31.

We claim:

1. A plain bearing apparatus body comprising:
   a support body defining an outer circumference and having an inner surface coated with a sliding layer, said support body being formed with at least one bore extending through said support body to said sliding layer at a location at which the temperature is to be determined;
   a bearing housing havng a nest for receiving said support body; and
   measuring means for determining the temperature of said sliding layer at said location, said measuring means including:
   a heat conductor element fixedly arranged within said bore of said support body; and
   a sensor for temperature sensing and measuring received in said nest, said heat conductor element having one end section in thermally conductive connection with said sliding layer and extending within said bore towards said outer circumference of said support body and being in thermally conductive contact at an opposite end section with said temperatrue sensing and measuring element, said support body being provided at its circumference with a guide track aligned with said heat conductor element in such a manner that upon turning in said support body into said bearing housing said temperature sensing and measuring element is retracted by said guide track and allowed to run along said circumference until being in alignment with said heat conductor element.

2. The apparatus defined in claim 1 wherein said support body is formed with a plurality of radial bores, each of which accommodates a respective one of said heat conductor elements for allowing determination of the temperature at respective locations of said sliding layer.

3. An apparatus as defined in claim 1 wherein said suport body is provided with an intermediate base layer, one end of said heat conductor element being in heat conducting contact with said intermediate layer and said support body, further comprising a thermally insulating sleeve surrounding and heat insulating the remainder of said heat conductor element from said support body.

4. An apparatus defined in claim 3, further comprising fastening means for positioning said heat conductor element with said bore of said body, said fastening means including a plug fittingly inserted within said bore of said body formed with a recess and embracing said heat conductor element and said sleeve.

5. An apparatus defined in claim 4 wherein said plug is pressed into said bore of said body.

6. An apparatus defined in claim 4 wherein said recess defines a space around said heat conductor element which is filled by said sleeve, said recess having a top portion extending inwardly to define a through-passage through which an inner end of said heat conductor element projects.

7. An apparatus defined in claim 6 wherein said conductor element is of inverted T-shape to define an elongated portion of a relatively small diameter and a head portion of a relatively large diameter, said head portion being turned toward said peripheral surface of said support body.

8. An apparatus defined in claim 7 wherein the diameter of said elongated portion corresponds to the diameter of said through-passage.

9. An apparatus defined in claim 4 wherein said plug and said support body are made of same material.

10. An apparatus defined in claim 9 wherein said plug and said support body are made of steel.

11. An apparatus defined in claim 4 wherein said plug has an end face directed to said sliding layer, said end face being coated with a metal layer.

12. An apparatus defined in claim 1 wherein said sliding layer forms a bearing face and has a thickness, said heat conductor element being spaced from said bearing face by a distance corresponding to at least said thickness of said sliding layer.

13. An apparatus defined in claim 12 wherein an inner end of said heat conductor element is contacted by said sliding layer.

14. A plain bearing as defined in claim 1 wherein said guide track cooperates with a circumferential guide groove extending to said one end section of said heat conductor to allow said temperature sensing and measuring element to run within said groove until being in alignment with said heat conductor.

15. An apparatus defined in claim 1, further comprising fastening means for positioning said sensor in said bearing housing, said fastening means including a guide bush embracing said sensor, a sleeve surrounding said guide bush and having an end portion extending beyond said bearing housing, a screw cap for locking said end portion outside said bearing housing, and a spring having one end abutting said sensor and another end supported by said screw cap to bias said sensor toward said outer end of said heat conductor element.

* * * * *